(12) United States Patent
Accarie

(10) Patent No.: US 7,031,339 B1
(45) Date of Patent: Apr. 18, 2006

(54) METHOD AND DEVICE FOR COMMUNICATING DIGITAL INFORMATION AND APPLIANCES USING THEM

(75) Inventor: Jean-Paul Accarie, Vern sur Seiche (FR)

(73) Assignee: Canon Research Centre France S.A., Cesson-Sevigne Cedex (FR)

( * ) Notice: Subject to any disclaimer, the term of this patent is extended or adjusted under 35 U.S.C. 154(b) by 0 days.

(21) Appl. No.: 09/427,180

(22) Filed: Oct. 26, 1999

(30) Foreign Application Priority Data

Oct. 30, 1998 (FR) .................................. 98 13701

(51) Int. Cl.
*H04J 3/22* (2006.01)

(52) U.S. Cl. ................ 370/466; 370/230; 370/395.21; 709/226

(58) Field of Classification Search ........ 370/466–467, 370/392, 428, 470–477; 710/52, 56, 22, 710/26–27; 709/213–214, 217
See application file for complete search history.

(56) References Cited

U.S. PATENT DOCUMENTS

| | | | | |
|---|---|---|---|---|
| 5,625,795 A | * | 4/1997 | Sakakura et al. | 711/148 |
| 5,703,965 A | * | 12/1997 | Fu et al. | 382/232 |
| 5,825,890 A | * | 10/1998 | Elgamal et al. | 713/151 |
| 6,018,816 A | * | 1/2000 | Tateyama | 714/746 |
| 6,038,625 A | * | 3/2000 | Ogino et al. | 710/104 |
| 6,064,772 A | * | 5/2000 | Tanno et al. | 382/236 |
| 6,119,243 A | * | 9/2000 | Garney et al. | 713/600 |
| 6,151,651 A | * | 11/2000 | Hewitt et al. | 710/315 |
| 6,185,607 B1 | * | 2/2001 | Lo et al. | 709/213 |
| 6,233,611 B1 | * | 5/2001 | Ludtke et al. | 709/223 |
| 6,286,071 B1 | * | 9/2001 | Iijima | 710/124 |
| 6,295,516 B1 | * | 9/2001 | Takeyasu | 703/13 |
| 6,324,178 B1 | * | 11/2001 | Lo et al. | 370/392 |
| 6,356,968 B1 | * | 3/2002 | Kishon | 710/306 |
| 6,384,928 B1 | * | 5/2002 | Nagasawa et al. | 358/1.15 |
| 6,424,795 B1 | * | 7/2002 | Takahashi et al. | 386/120 |

(Continued)

FOREIGN PATENT DOCUMENTS

EP 715459 A2 * 6/1996

(Continued)

OTHER PUBLICATIONS

Shea, T.J. et al. "Evaluation of IEEE 1394 Serial Bus for Distributed Data Acquisition" Particle Accelerator Conference, May 12-16, 1997, vol. 2, pp. 2502-2504.*

Severance, C. "Linking Computers and Consumer Electronics" Computer, Feb. 1997, vol. 30, Issue 2, pp. 119-121.*

(Continued)

*Primary Examiner*—Brian Nguyen
*Assistant Examiner*—Tri H. Phan
(74) *Attorney, Agent, or Firm*—Fitzpatrick, Cella, Harper & Scinto

(57) ABSTRACT

A method of communicating digital information of different data formats via a plurality of communication channels shared between several communication means includes a reception operation, a reformat operation, and a transmission operation. In the reception operation, digital information having a first format and transmitted via a first communication channel from communication means that uses the first format is received. In the reformat operation, the received digital information having the first format is reformatted to digital information having a second format different from the first format, if resources to use a second channel for transmission of digital information having the second format are available. In the transmission operation, the digital information having the second format is transmitted via the second channel and is received by communication means that uses the second format.

4 Claims, 10 Drawing Sheets

U.S. PATENT DOCUMENTS 6,438,604 B1 * 8/2002 Kuver et al. ................. 709/234
6,502,144 B1 * 12/2002 Accarie ......................... 710/8
6,505,255 B1 * 1/2003 Akatsu et al. .............. 709/239

FOREIGN PATENT DOCUMENTS

EP          758827 A2 * 2/1997
JP          10-271146      10/1998

OTHER PUBLICATIONS

Tan, Yasuo "Scaling Up a IEEE 1394 DV Network to an Enterprise Video LAN with ATM Technology" Consumer Electronics, Jun. 2-4, 1998, pp. 112-113.*

Laurent Frouin, "Method and device for communicating information", U.S. Appl. No. 09/345,969 filed on Jul. 1, 1999.*

* cited by examiner

METHOD AND DEVICE FOR COMMUNICATING DIGITAL INFORMATION AND APPLIANCES USING THEM

BACKGROUND OF THE INVENTION

The present invention concerns a method and device for communicating information. It applies in particular to high-performance buses such as the bus complying with IEEE 1394 (the name of a standard of the Institute of Electrical and Electronic Engineers: "*IEEE Standard for a High Performance Serial Bus*" published by the Institute of Electrical and Electronic Engineers, Inc. Draft 8.0v2, IEEEP1394, 7 Jul. 1995).

On such a bus, appliances using different data formats can coexist. For example, in the field of audio and video data transmission, the data formats known as:

"DIGITAL VIDEO", a digital video compression format supported by more than 55 commercial companies, in accordance with the DV standard IEC 61834 or the document "Specifications of consumer-use digital VCRs using 6.3 mm magnetic tape", published in December 1994 by the "HD Digital VCR Conference", known as the "Blue Book", "MPEG2" (acronym of "Moving Pictures Expert Group"), ISO/CCITT standard on digital compression for the compression of audio video sequences (references: ISO/IEC 13818-1, 13818-2 and 13818-3), and "JPEG 2000" (acronym of "Joint Photographic Expert Group"), ISO/CCITT standard on digital compression use for the compression of fixed images, with or without encrypting, with or without data compression and with or without organisation of data groups, can be simultaneously used by different peripherals. These appliances may have to communicate with each other.

It is known, in the state of the art, to interpose, between each peripheral and the bus used, or to integrate in the peripheral, a "codec" (abbreviation of "coder-decoder"), or an adaptor, which decodes the format of the data passing over the bus and encodes them in the data format used by the peripheral in question. This solution is not satisfactory since it entails the use of a codec for each peripheral.

BRIEF SUMMARY OF THE INVENTION

The present invention sets out to respond to this drawback.

To this end, the present invention relates, according to a first aspect, to a method of communicating digital information over at least one communication medium shared between several communication means, all said media using the same communication protocol and being physically identical, characterised in that it includes:

a first operation of transmitting, by a first communication means, said information to be transmitted, having a first format, on a first medium.

an operation of receiving transmitted information having the first format, by a second communication means, an operation of reformatting the received information having the first format, in order to give it a second format different from the first format, effected by the second communication means, and a second operation of transmitting, by said second communication means, said information having the second format, on a second medium.

It should be noted here that, within the meaning of the present invention, a format can result from a coding, an encrypting, a compression or a data formatting, or again a transmission mode, for example isochronous or asynchronous.

Here, each communication medium is preferentially a high-performance bus.

By virtue of these provisions, a single coder-decoder can suffice for all the peripherals connected to the communication medium since it offers its services to all the other peripherals simultaneously. This coder-decoder receives the coded data in the first format coming from a first peripheral, by means of a communication medium, decodes them and encodes them according to a second format, intended for all the peripherals connected to the communication medium.

According to particular characteristics, following each initialisation operation, the said reformatting operation is effected on any information having said first format.

By virtue of these provisions, implementation of the invention is automatic, as soon as the computer system is initialised.

According to particular characteristics, the method to which the present invention relates, as succinctly disclosed above, includes an operation of determining the need to reformat received digital information having the first format and, when reformatting is necessary, said reformatting operation and said transmission operation are effected on said received digital information.

By virtue of these provisions, only the information whose reformatting is necessary is processed in accordance with the method which is the object of the present invention.

According to particular characteristics, said necessity determination operation takes into account any destination address of said received data.

By virtue of these provisions, the reformatting operation can be suspended in the event of inconsistency between the characteristics of the second format and those of the destination peripheral.

According to particular characteristics, said necessity determination operation takes into account a transmission channel identifier used during the first transmission operation.

By virtue of these provisions, the information to be reformatted can be selected according to the channel on which said information is conveyed.

According to particular characteristics, said necessity determination operation takes into account the bandwidth to be used during the second transmission operation.

By virtue of these provisions, when the bandwidth to be used by the second transmission is too great, the reformatting is not effected or is renegotiated, in order to avoid congestion of the computer system.

According to particular characteristics, the second communication means being adapted to reformat at least two received information formats, said necessity determination operation takes into account the first format of the received information.

By virtue of these provisions, the information to be reformatted can be sorted according to its first format.

According to particular characteristics, the communication method to which the present invention relates, as succinctly disclosed above, includes an operation of stopping formatting in that, following said stoppage operation, the reformatting operation is no longer performed on the received data having the first format.

By virtue of these provisions, the user or a computer application used on the computer system under consideration can stop, temporarily or definitively, the implementation of the method to which the present invention relates.

According to particular characteristics, after any information reception operation, the communication method to which the present invention relates, as succinctly disclosed above, includes an operation of detecting the first format and, when the first format is detected, said reformatting operation is performed on any information having the first format.

By virtue of these provisions, triggering of the reformatting takes place only on the information which has it.

According to particular characteristics, the first communication medium and the second communication medium are merged.

By virtue of these provisions, all the peripherals connected to this communication medium receive the data according to the two formats. No connection precaution therefore has to be taken, with regard to the choice of a bus.

According to other particular characteristics, the first communication medium and the second communication medium are not merged.

By virtue of these provisions, a judicious distribution of the peripherals can be effected between the communication media, so that each item of information to be transmitted is transmitted only once on each communication medium, in a different format for each communication medium.

The peripherals which use the same data format are then preferentially grouped on the same communication means.

According to other particular characteristics, the method as succinctly disclosed above includes operations of isolating flow between two buses.

By virtue of these provisions, the communication resources, such as, for example, the channels and bandwidth, of each of the two communication media are saved on. When the device to which the first invention relates uses bus bridge functions, the peripherals which are situated on each side of the device to which the present invention relates can communicate as if they were on the same bus.

According to other particular characteristics, one of the transmission operations is performed in isochronous mode and the other in asynchronous mode.

By virtue of these provisions, the different peripherals which do not belong to the same family (isochronous/asynchronous) can communicate with each other. These provisions thus permit a protocol transformation or adaptation (for example AV/C-SBP2).

According to other particular characteristics, the communication method as succinctly disclosed above includes a communication resource allocation operation for at least one transmission operation on the communication medium concerned.

For example, the communication resources are communication channels.

According to other particular characteristics, the communication method as succinctly disclosed above includes a bandwidth reservation operation for at least one transmission operation.

By virtue of these provisions, a quality of service (the quantity of information transmitted and the transmission time limited) can be guaranteed for each communication in such a way that a real-time communication can be set up.

According to other particular characteristics, during at least one transmission operation, it is determined whether, at the moment of sending, there is sufficient resource and, in the affirmative, sending is effected and, if not, it is considered that the information to be transmitted is lost.

The service offered by the coder-decoder is then said to be "best effort", it is non-priority, compared with the other information flowing on the communication medium or media. There can therefore be auto-adaptation of the communication.

According to a second aspect, the present invention relates to a device for communicating digital information over at least one communication medium shared between several communication means, all said media using the same communication protocol and being physically identical, characterised in that it has a communication means which:
  has a means of receiving information transmitted over a first medium by a first communication means and having the first format,
  is adapted to reformat the received information having the first format, in order to give it a second format different from the first format, and
  is adapted to transmit said information having the second format, over a second medium.

The invention also relates to a network, a computer, a camera, a facsimile machine, a copier, a printer, a camcorder, a video tape recorder, a display means, a modem, a television receiver, a photographic apparatus, a mass memory and a scanner, characterised in that they have a device as succinctly disclosed above.

The invention also relates to:
  an information storage means which can be read by a computer or microprocessor storing instructions of a computer program, characterised in that it allows implementation of the method of the invention as succinctly disclosed above, and
  an information storage means which is removable, partially or completely, and can be read by a computer or microprocessor storing instructions of a computer program, characterised in that it allows the implementation of the method of the invention as succinctly disclosed above.
  an information storage means which can be read by a computer or microprocessor storing information, characterized in that said information are issued from the implementation of the communication method of the invention as succinctly disclosed above.

The preferential or particular characteristics, and the advantages of this device, network, computer, camera, facsimile machine, copier, printer, camcorder, video tape recorder, display means, modem, television receiver, photographic apparatus, mass memory, scanner and information storage means being identical to those of the device as succinctly disclosed above, these advantages are not repeated here.

BRIEF DESCRIPTION OF THE DRAWINGS

Other advantages, aims and characteristics of the present invention will emerge from the following description, given with reference to the accompanying drawings, in which.

DESCRIPTION OF PREFERRED EMBODIMENTS

Figure 1:
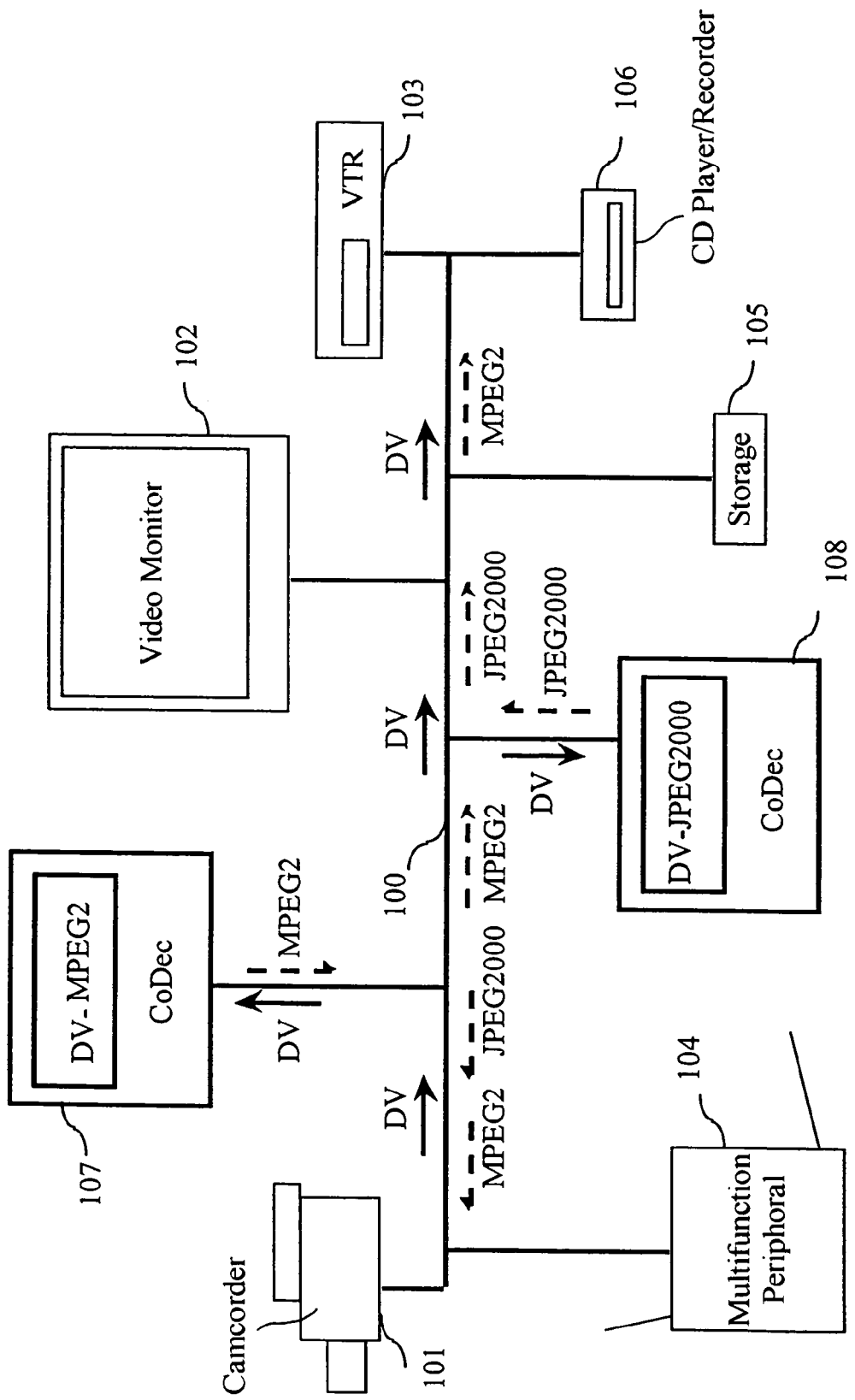
FIG. 1 depicts schematically a computer system having peripherals connected together by a bus in accordance with the present invention, according to a first embodiment of the invention.

In the first embodiment, illustrated in FIG. 1, a bus 100 can be seen, to which three groups of peripherals are connected.

The first group concerns the peripherals functioning with the DIGITAL VIDEO format. It includes a camcorder 101 and a video tape recorder 103.

The second group concerns the peripherals using the MPEG2 standard and includes a video monitor 102, a data storage unit 105 and a compact disc player and recorder 106.

Finally, a third group concerns the peripherals using the JPEG 2000 standard and includes solely a multifunction peripheral (combining the functions of a printer, scanner, copier and facsimile machine) 104.

For reasons of clarity, arrows have been shown along the links between the peripherals, in order to symbolise the data flows between these peripherals, in the case where the camcorder 101 delivers a data flow in the DV format.

To the bus 100 there are also connected two coder-decoder (codec) peripherals implementing the present invention: the coder-decoder peripheral 107 translates, from one to the other, the data formats DIGITAL VIDEO on the one hand, and MPEG2 on the other hand; the coder/decoder peripheral 108 translates, from one to the other, the data formats DIGITAL VIDEO on the one hand and JPEG 2000 on the other hand.

With the exception of the coder-decoder peripherals 107 and 108, all the peripherals depicted in FIG. 1 are well known to persons skilled in the art and are therefore not presented any further here.

It should be noted here that two components announced by the Californian company C-cube Microsystems Inc, referenced DVxpress-MX25® and Dvxpress-MX50 are dedicated to the real-time translation of data in the DIGITAL VIDEO format into the MPEG2 format and vice-versa. These components can be principal components of the CoDec module of the coder-decoder peripheral 107.

In accordance with the present invention, two "channels" (resources with which there are associated sets of intervals of time during which the bus is allocated, periodically, to a communication) are used by each coder-decoder peripheral 107 and 108, each of the channels corresponding to a data format used by the coder-decoder in question. Thus, in FIG. 1, the bandwidth of the bus 100 is shared between at least three channels, the first using the digital video data format, the second using the MPEG2 data format and the third using the JPEG 2000 data format. Each channel corresponds to part of the bandwidth of said bus of each coder which receives data on a channel using a data format which it knows, decodes these data and re-encodes them on a second channel using the second data format which it offers.

The following operations follow each other for all the data transmitted in one of the data formats used by at least one of the coder-decoder peripherals:

a first operation of transmission, by a first communication means 101 to 106, of said information to be transmitted, having a first format, on a first medium, here the bus 100, a operation of receiving transmitted information having the first format, by a second communication means, here one of the coder-decoder peripherals 107 or 108, a operation of reformatting received information having the first format, in order to give it a second format different from the first format, performed by the second communication means, and a second operation of transmission, by said second communication means, of said information having the second format, on a second medium, here the bus 100.

Thus all the peripherals can gain access to the same data in each of the formats used by at least one of the peripherals. An audio-video sequence issuing from the camcorder 101 is therefore on the one hand transmitted in the DIGITAL VIDEO data format, on a first channel, and the in the MPEG2 data format on a second channel, and then in a third data format JPEG 2000 on a third channel. With regard to the JPEG 2000 format, which relates to fixed images, the device which is the object of the present invention can either effect a selection of a few images amongst those which have come from the camcorder 101 in order to translate them into the JPEG 2000 format, for example, at the initiative of the user, by means of a trigger or keyboard, or to translate all the images coming from the camcorder 101. Each peripheral therefore has available data in the data format which it is using.

Figure 2:
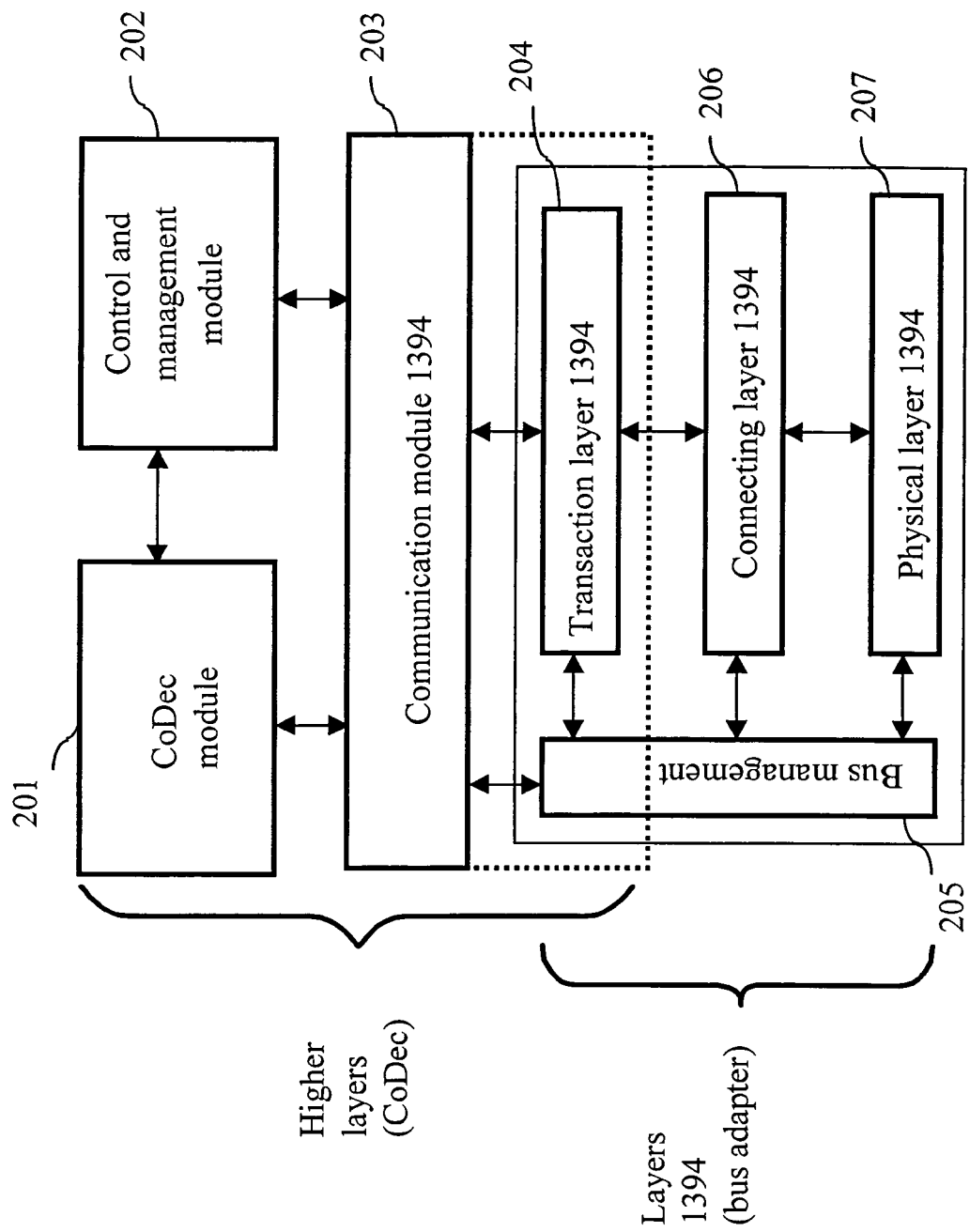
FIG. 2 depicts different protocol layers used in accordance with the present invention, in the context of the first embodiment illustrated in FIG. 1.

FIG. 2 illustrates, in the form of protocol layers, the main modules used in each coder-decoder. These modules are divided into those which concern the upper layers (including, in particular, the coder-decoder layers) and those which concern the 1394 bus layers. Amongst the modules which concern only upper layers, there are a coder-decoder module 201, a control and management module 202 and a 1394 communication module 203. Amongst the modules which concern only the 1394 layers, there are a 1394 connecting layer module 206 and a 1394 physical layer module 207.

Finally, amongst the modules which concern both the upper layers and the 1394 layers, there are a 1394 transaction module 204 and a bus management module 205.

The last four modules mentioned, 204 to 207, are well known to persons skilled in the art and are not detailed here (their functional description is standardised).

The function of the coder-decoder module 201 is to receive the data from the communication module 203 and to return the processed data to it. The coder-decoder module 201 is controlled by the control and management module 202. It is capable of transmitting status or error information to the control and management module 202. It decodes the coded data in one of the two data formats which it knows and encodes these data in the second data format which it knows.

The 1394 communication module 203 implements notably the 1394 transaction module 204 and, partly, the bus management module 205. The 1394 communication module 203 is in charge of all the communications between the modules 201 and 202 on the one hand and the low-level modules 204 to 207 on the other hand.

The 1394 communication module 203 transfers the user data packets coming from or intended for the coder-decoder module 201 and the control and management data packets coming from or intended for the control and management module 202, intended or coming from any peripheral connected by means of the 1394 layers.

The control and management module 202 is responsible for the user interface: on the one hand, useful data may have to be introduced by a user and on the other hand information may be intended for this user (output channel number, error detection, etc). The user interface also serves for the user to communicate with the other software modules and to display information coming therefrom.

The control and management module 202 supplies general control and management functionalities independent of the coder-decoder module 201 (for example, the coder-decoder module can be replaced by any other functional module which modifies the format of the information, for example the encrypting of this information).

Amongst the general functionalities, the following list of functionalities can notably be given, aimed at modifying the information relating to communication on the serial bus, such as for example:
  an input channel number,
  an output channel number,
  a value, either precise, or minimum, or maximum, of the bandwidth,
  a property which must be verified by the 1394 peripheral to which the present invention relates (a property relating to the other peripherals present on the 1394 bus, such as, for example, the properties known to persons skilled in the art as "root", "isochronous master" and "cycle master"), and
  the results of an operation of polling the different peripherals present on the bus and their respective information.

Amongst the functionalities relating to the functional module used, the following list of functionalities can notably be given, for example in the case of a CoDec functional module:
  an instruction to start/pause/stop the functioning of the functional module,
  one or more input formats (DV, MPEG2, JPEG 2000),
  one or more output formats (DV, MPEG2, JPEG 2000),
  a conversion of the type of transmission mode (for example the conversions of transmission modes known to persons skilled in the art as "isochronous-asynchronous", "isochronous stream-asynchronous stream"), and
  a particular mode of implementing an isochronous-asynchronous transformation mode, such as, for example, capture triggered by the user of a fixed image, systematic capture of all the fixed images.

In the example of a functional encrypting module, the list of functionalities can include:
  a given type of encrypting/decrypting,
  a particular key for a given type of encrypting/decrypting.

Figure 9:
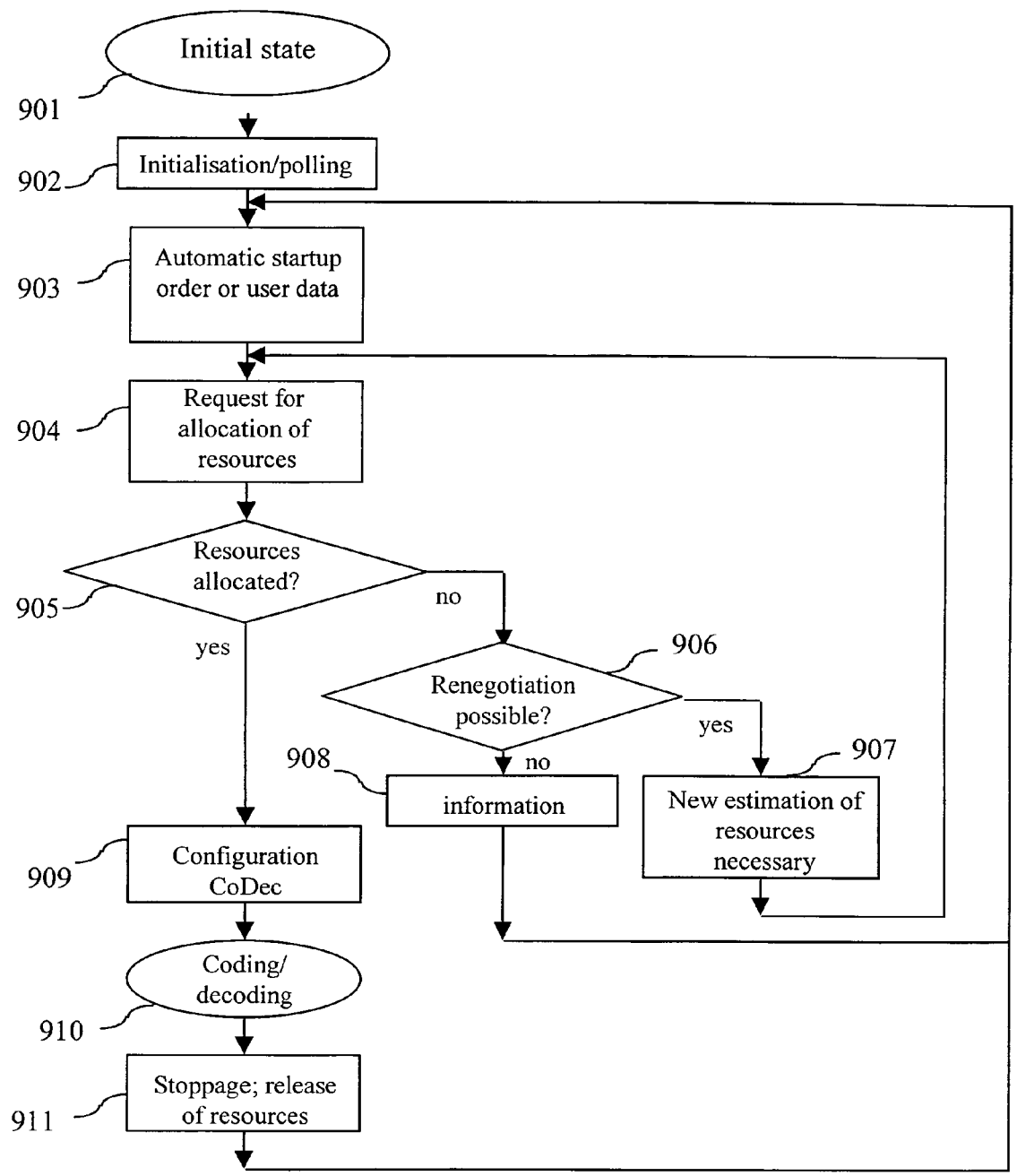
FIG. 9 depicts schematically an algorithm implemented by each embodiment of the present invention.

The control and management module 202 implements the algorithm illustrated in FIG. 9.

Figure 3:
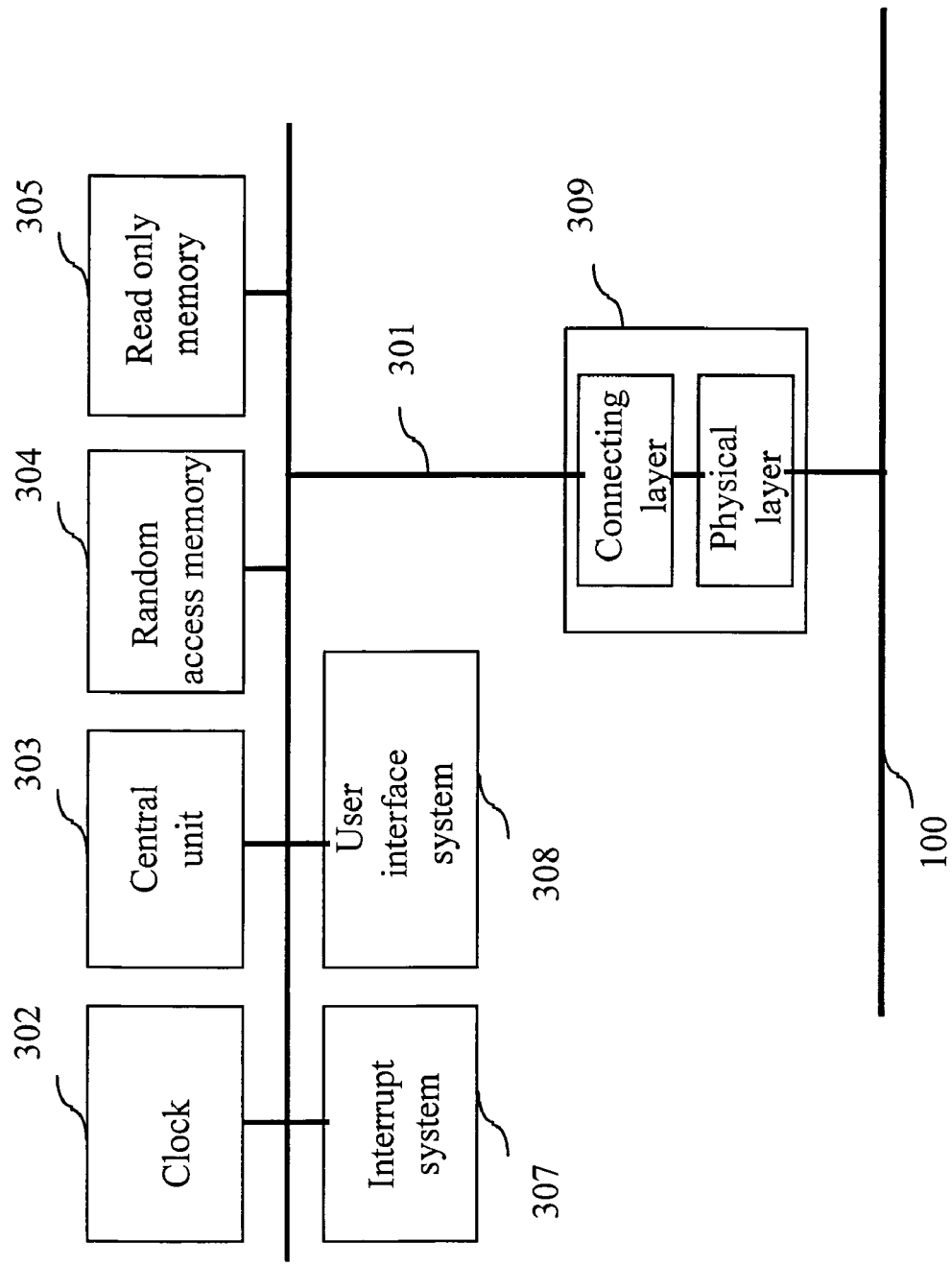
FIG. 3 depicts a block diagram of an electronic peripheral used in the first embodiment illustrated in FIG. 1.

In FIG. 3, the internal structure of a coder-decoder peripheral in accordance with the first embodiment of the present invention can be seen. This coder-decoder peripheral has a local bus 301 to which the following circuits are connected:
  a clock 302,
  a central processing unit 303,
  a random access memory RAM 304,
  a read only memory ROM 305,
  an interrupt management circuit 307,
  an user interface circuit 308, and
  a bus adapter 309.

The bus adapter 309 is also connected to the bus 100. The peripheral depicted in FIG. 3 is well-known to persons skilled in the art of data-processing systems and is not detailed any further here.

Figure 4:
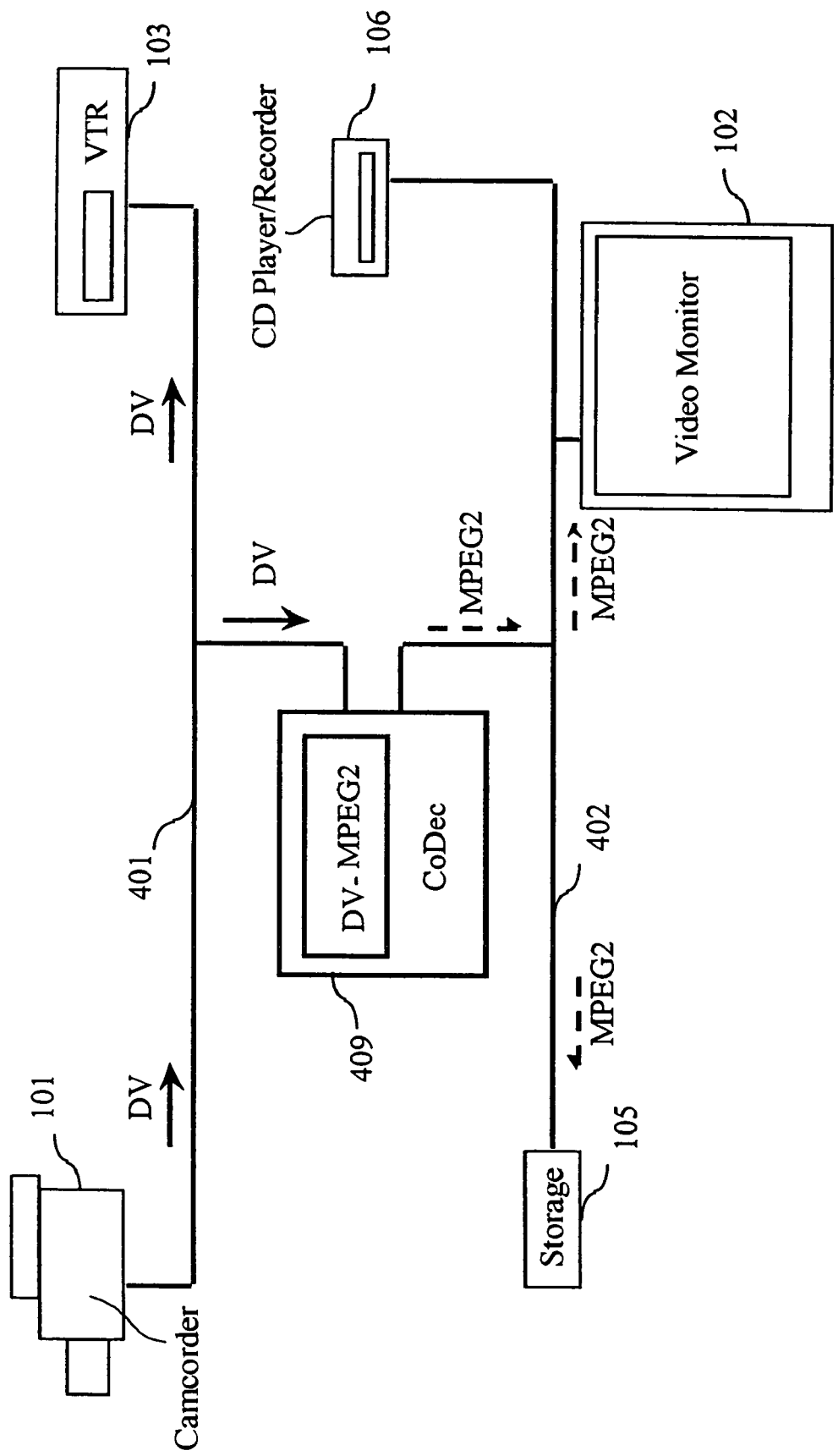
FIG. 4 depicts schematically a second embodiment of the present invention in which a computer system has two buses which are each connected to peripherals and which are connected together by means of a coder-decoder peripheral in accordance with the present invention.

In the second embodiment, illustrated in FIG. 4, two buses 401 and 402 can be seen, to which two groups of peripherals are respectively connected.

The first group concerns the peripherals operating with the DIGITAL VIDEO format. It includes a camcorder 101 and a video tape recorder 103.

The second group concerns the peripherals using the MPEG2 standard and includes a video monitor 102, a data storage unit 105 and a compact disc player and recorder 106.

For reasons of clarity, arrows have been depicted along the links between the peripherals, in order to symbolise the data flows between these peripherals, in the case of a flow of data in the DV format sent by the camcorder 101 and retransmitted over the bus 402.

A coder-decoder peripheral (codec) 409 is also connected to the buses 401 and 402, implementing the present invention and translating, from one to the other, the data formats DIGITAL VIDEO on the one hand and MPEG2 on the other hand.

With the exception of the coder-decoder peripheral 409, all the peripherals depicted in FIG. 1 are well known to persons skilled in the art and are therefore not presented any further here.

The components from the company C-cube Microsystems Inc mentioned with regard to FIG. 2 are also adapted to the implementation of this second embodiment of the present invention.

In the second embodiment, the coder-decoder 409 decodes the data which it receives over the bus 401 in the DIGITAL VIDEO format and re-encodes them in MPEG2 format in order to transmit them over the bus 402. Simultaneously, the coder-decoder 409 can decode the data which it receives over the bus 402, in the MPEG2 format, and can encode them in the DIGITAL VIDEO format in order to transmit them over the bus 401.

In accordance with the present invention, two "channels" are used by the coder-decoder peripheral 409, each of the channels corresponding to one of the data formats used by the coder-decoder 409. Thus, in FIG. 5, the bandwidth occupied by each of the buses 401 and 402 corresponds to a single channel. The coder-decoder 409 receives data over a channel of the bus 401 using a data format which it uses, decodes these data and re-encodes them on another channel of the bus 402 using the second data format which it offers.

The following operations succeed each other for all the data transmitted in one of the data formats used by the coder-decoder peripheral 409:
  a first operation of transmitting, by a first communication means 101 to 103, 105 or 106, said information to be transmitted, having a first format, on a first medium, here one of the buses 401 or 402 to which the first communication means is connected,
  an operation of receiving transmitted information having the first format, by a second communication means, here the coder-decoder peripheral 409, an operation of reformatting the received information having the first format, in order to give it a second format different from the first format, effected by the second communication means, and a second operation of transmitting, by said second communication means, said information having the second format, on a second medium, here whichever of the two buses 401 or 402 has not been the medium for the first transmission operation.

Thus all the peripherals can have access to the same data in the format which it uses. An audio-video sequence coming from the camcorder 101 is therefore on the one hand transmitted in the DIGITAL VIDEO data format on the first bus over a first channel, and then in the MPEG2 data format on the second bus over a second channel. Each peripheral therefore has data in the data format which it uses.

Figure 5:
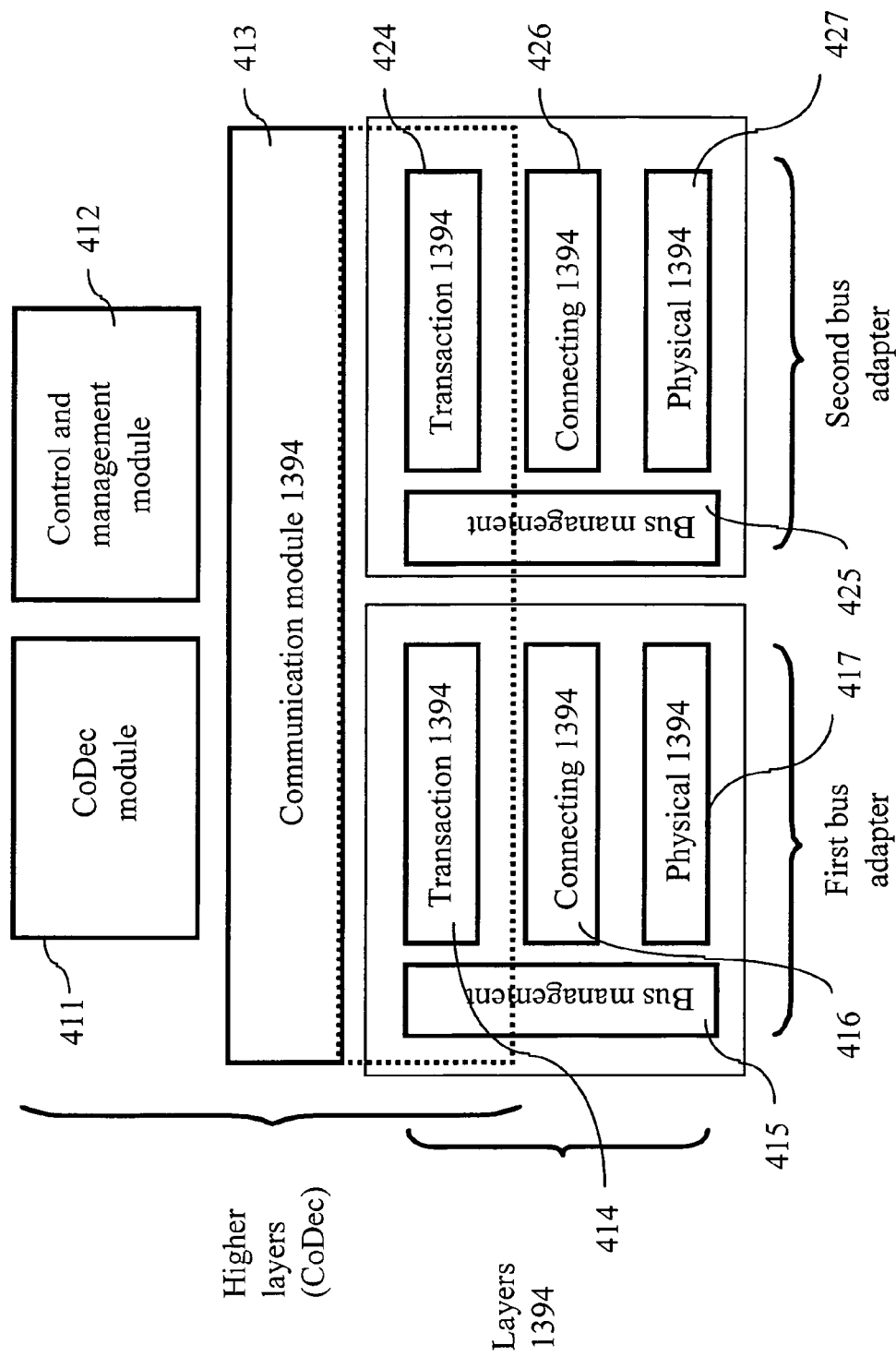
FIG. 5 depicts different protocol layers used in accordance with the present invention, in the context of the second embodiment illustrated in FIG. 4.

FIG. 5 illustrates, in the form of protocol layers, the main modules used in the coder-decoder 409. These modules are divided into those which concern the upper layers and those which concern the 1394 bus layers.

Amongst the modules which concern only the upper layers, there is a coder-decoder module 411, a control and management module 412 and a 1394 communication module 413.

Amongst the modules which concern only the 1394 layers, there are:

for communication on the bus 401, a 1394 connecting layer module 416 and a 1394 physical layer module 417, and for communication on the bus 402, a 1394 connecting layer module 426 and a 1394 physical layer module 427.

Finally, amongst the modules which concern both the upper layers and the 1394 layers, there are:

for communication on the bus 401, a 1394 transaction module 414 and a bus management module 415, and for communication on the bus 402, a 1394 transaction module 424 and a bus management module 425.

Each of these modules is identical to the one which corresponds to it in FIG. 2. In particular, the control and management module 412 implements the algorithm illustrated in FIG. 9. However, the 1394 communication layer takes responsibility for the communication aspects with the first and second bus adapter.

Figure 6:
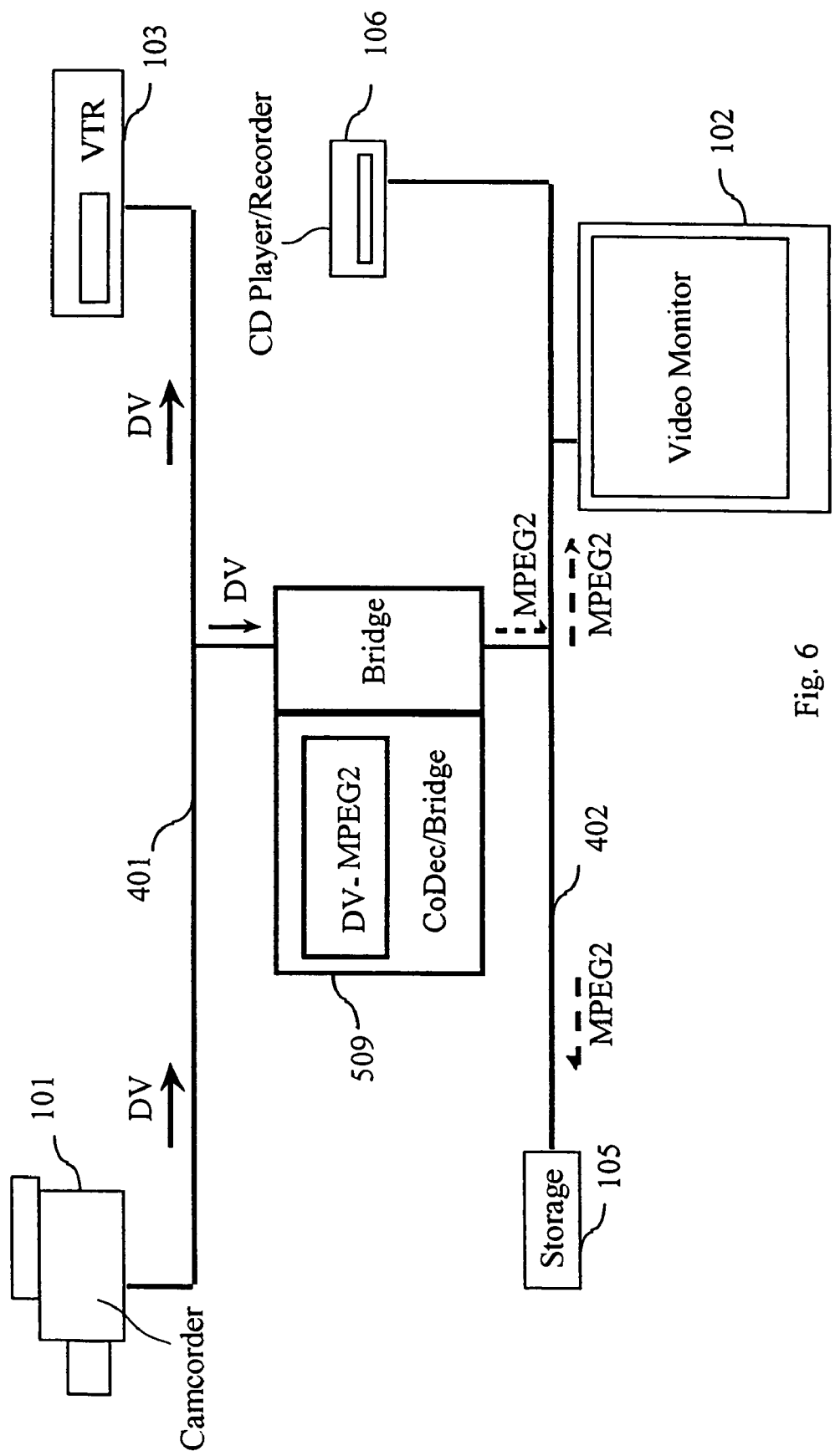
FIG. 6 depicts schematically a third embodiment of the present invention in which a computer system has two buses to which peripherals are connected and which are connected together by means of a coder-decoder peripheral performing interbus communication functions and complying with IEEE P 1394.1 (currently being specified)

In the third embodiment of the present invention, illustrated in FIG. 6, all the buses and peripherals illustrated in FIG. 4 are found again. However, a coder-decoder peripheral 509, which also fulfils the function of a bridge between the buses, is interposed between the two identical buses 401 and 402 and implements the 1394 communication protocol (the specification of the 1394 bridges, IEEE 1394-1 Draft 0.03 of 18 Oct. 1997, is, at the data of filing of the present application, still in the course of definition).

The coder-decoder peripheral 509 effects an isolation of flow between the two buses 401 and 402.

Figure 7:
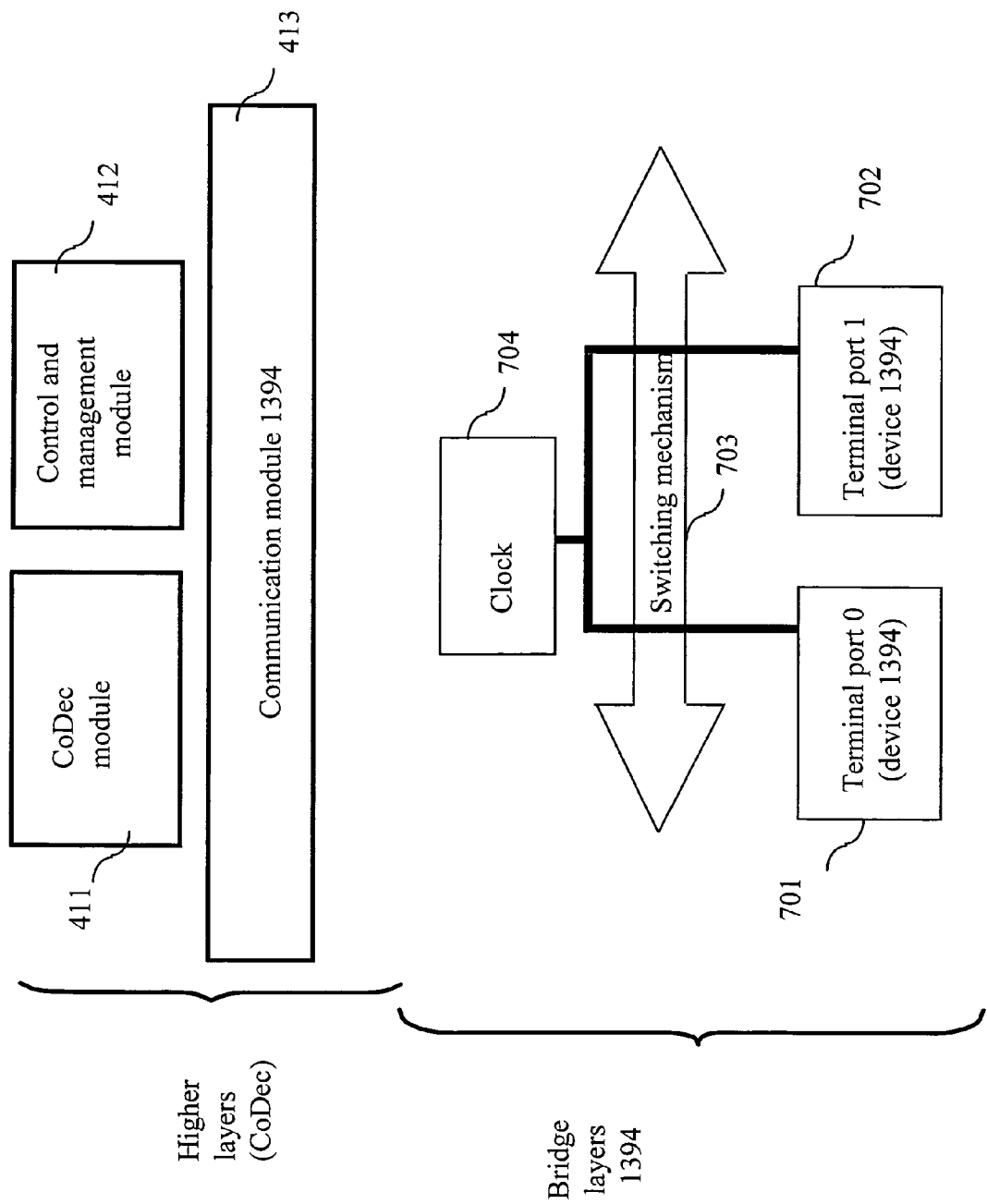
FIG. 7 depicts different protocol layers used in accordance with the present invention, in the context of the third embodiment illustrated in FIG. 6.

For a better understanding of the functioning of the coder-decoder peripheral 509 of the third embodiment of the present invention, a functional description of a "1394 bridge" component is given below with regard to FIG. 7. A serial bus bridge consists of two bridge portals 701 and 702, a switching fabric 703 specific to the implementation and a cycle clock 704, all associated with a mechanism for distributing clock pulses to the portals.

The pattern of a serial bus bridge is as follows: each portal is a peripheral (or node) of the serial bus with its own addressing space on the bus to which it is connected. A portal uses notably the layers 204 to 207 disclosed with regard to FIG. 2. A portal responds to the serial bus, read, write and read or write with latching requests coming from the bus to which it is connected as described in the standard "P1394.1 Draft 0.03".

A portal manages all the "serial bus" packets, asynchronous and isochronous, in order to determine which packets, if any, must be transmitted by means of the switching mechanism to the other portal.

The portals are connected by means of the switching mechanism responsible for transferring any serial bus packet from one portal to the other portal. A serial bus bridge is a collection of portals connected together by the switching fabric.

The clock is a common resource with which the two portals must be synchronised. This clock is optional but becomes obligatory as soon as the serial bus bridge supports a data transfer of the isochronous type.

In the third embodiment, and in comparison with FIG. 2, the 1394 communication layer takes over the interface aspect with the implementation of the computer system commonly referred to as a 1394 bridge by persons skilled in the art.

The provisions of the second and third embodiments have the advantage that each bus, 401 or 402, has to convey each item of information only according to a single type of coding, which, compared with the first embodiment, releases communication resources such as, for example, bandwidth on each of these buses. On the other hand, the connection of a peripheral is less flexible since only two buses can make a peripheral using a given coding communicate.

Figure 8:
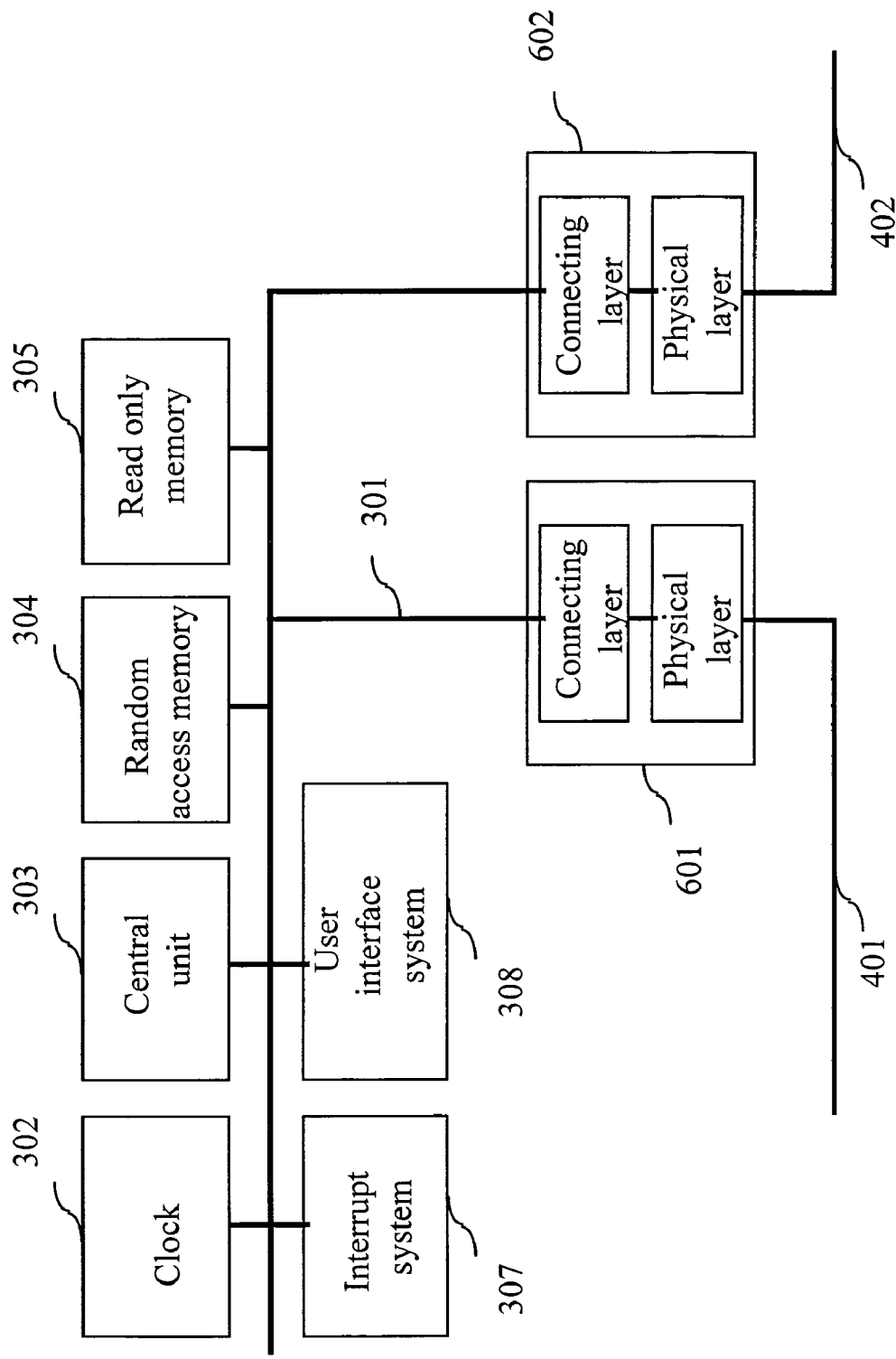
FIG. 8 depicts a block diagram of the coder-decoder peripheral illustrated in FIGS. 4 and 6.

FIG. 8 shows the circuits incorporated in the coder-decoder peripheral 509 or in the coder-decoder peripheral 409. These circuits are identical to those incorporated in the coder-decoder peripheral 107 (see FIG. 3), except for the bus adaptor 309, which is replaced here by two bus adaptors 601 and 602. Each of these two bus adaptors is connected to the local bus 301. The first bus adaptor 601 is also connected to the bus 401. The second bus adaptor 602 is also connected to the bus 402.

FIG. 9 schematically represents the algorithm on which is based a computer program and which includes steps or operations of the communication method according to the invention.

These steps or operations correspond to instructions or code portions of the computer program.

The communication method in accordance with the invention is implemented when the instructions or code portions of this computer program are carried out by the central unit. The implementation of the communication method pursuant to the invention allows to obtain information or data, at least for some steps or operations of the algorithm.

The instructions or code portions of the computer program and/or information or data issued from the performing of this computer program are stored in an information storage means which can be removable, partially or completely.

Information storage means can be, for example, a compact-disc, a floppy-disc, a hard-disc . . .

In FIG. 9 it can be seen that the coder-decoder, being in an initial state 901, once connected to the bus, enters an initialisation phase 902 during which it polls the different peripherals present on the visible bus or buses, in order to store different data such as "the unique identifier of the peripheral, the format or formats managed, the current address".

As soon as an event causing an reinitialisation of the bus (known as "reset") occurs on the bus or on one of the buses, the coder-decoder once again enters this initialisation phase for the bus or buses in question.

The information sent by the coder-decoder peripheral can be intended either for all the other peripherals present on the bus or buses ("broadcast/multicast"), or to a particular peripheral present on the bus or one of the buses.

The control and management module can decide either automatically to initiate the operation of the coder-decoder module or to request a start given by the user. Where the information issuing from the coder-decoder peripheral is intended for a particular peripheral, the control and management module warns the user and the sending peripheral or peripherals of a problem in receiving information output (for example inconsistency between the format of the output information and that processed by the destination peripheral).

It should be noted that, being in a state 901, the coder-decoder peripheral detects data at the input or coding/decoding start-up functions imposed by the user, during operation 903.

According to a first variant, during the operation 903, after any information reception operation, the coder-decoder peripheral performs an operation of detecting the first format and, when the first format is detected, the reformatting procedure is effected on any information having the first format (see operation 904 to 911).

According to a second variant, during the operation 903, the central unit of the peripheral determines the need to reformat digital information received, and causes the reformatting of the digital information received only if necessary.

In order to determine this necessity, the central unit can take into account any destination address of said data received, a transmission channel identifier used during the first transmission operation, a bandwidth to be used during the second transmission operation, the first format of the information received, in particular when the coder-decoder peripheral is adapted to reformat more than one data format.

Next, during an operation 904, the control and management module requires, where necessary, from the peripheral managing the bus resources, resources including for example the allocation of a channel, the allocation of sufficient bandwidth for decoded and then re-encoded data to be able to pass over this bus. Next, during a test 905, the control and management module determines, where necessary, whether the resources requested were allocated to it or not.

In the event of detection of a resource allocation problem, the control and management module can, if the input/output formats so permit, trigger a renegotiation of the resources allocated, such as for example output (or even input) bandwidth in order to allow a minimum service of reformatting information from the input to the output (operations 906 and 907).

According to a variant which is not shown, after a certain number of fruitless attempts, the renegotiation authorisation is withdrawn.

Thus, when the result of test 905 is negative, during a test 906, the control and management module determines whether or not a resource negotiation is authorised. When the result of test 906 is positive, during an operation 907, a new resource request is determined. Then the operation 904 is reiterated.

When the result of the test 906 is negative, during an operation 908, the control and management module takes account of this and informs the user (and, as a variant, the peripherals concerned) of the unavailability of the resources necessary for functioning.

When the result of the test 905 is positive, during an operation 909, the control and management module configures and initiates the functioning of the coder-decoder module in order to decode the format of the input data and the transfer of the decoded data to a selected output. Then, having entered the state 910, the coder-decoder module proceeds with the encoding of the decoded data during the operation 909 in accordance with the second data format which it uses.

When, during an operation 911, the control and management module determines that there are no more encoded data at the input and that the user has given an instruction to stop functioning of the coder-decoder, it returns to the state 903 after having released the resources which, where applicable, had been allocated. Likewise, at the end of the operation 908, the control and management module returns to the state 903. In each of these two cases, the control and management module awaits an operator action in order to continue execution of the flow diagram.

The device according to the present invention accepts at the input information arriving in isochronous or asynchronous transmission mode, delivers information in isochronous or asynchronous transmission mode and applies, where applicable, conversions of the isochronous to asynchronous or asynchronous to isochronous transmission type.

In the case of conversion of asynchronous to isochronous transmission type, the information at the input must be sufficient to permit the reconstitution of an item of information of the isochronous type (the case of a video sequence, for example).

In the case of conversion of the isochronous to asynchronous transmission type, the isochronous information (DV type audio video for example) at the input is transformed under the control of the control and management module into asynchronous information, of the JPEG 2000 type, for example, at the output (for example, the user displaying the input sequence of the present invention on a video monitor, at a given moment, selects a video image (initiates a capture)).

The action of disconnecting the coder-decoder peripheral from the bus or buses causes return to the state 901.

Figure 10:
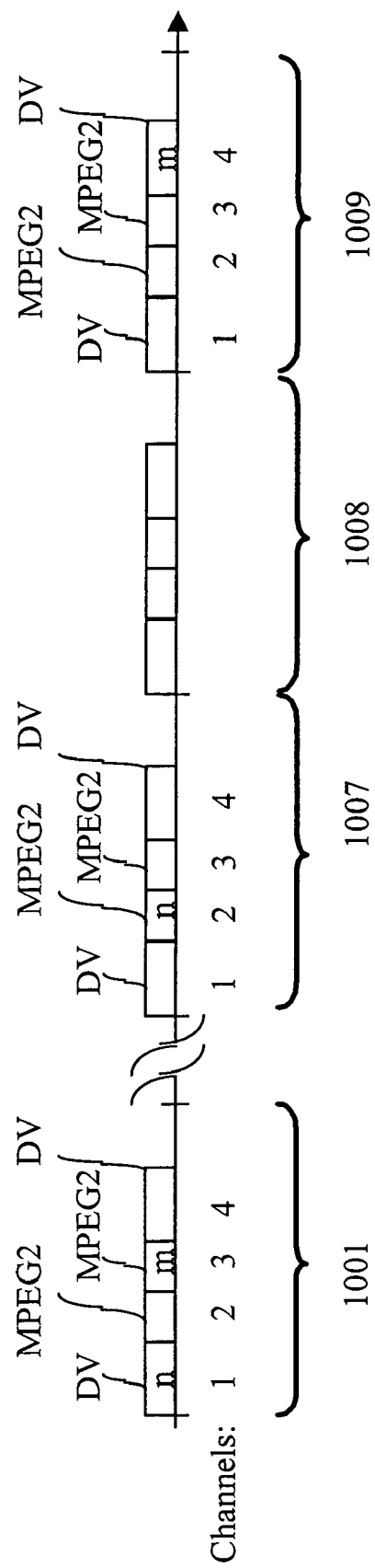
FIG. 10 depicts schematically the functioning of a coder-decoder peripheral.

In FIG. 10, it can be seen that, on a horizontal line representing the lapse of time, regular time intervals, 1001 to 1010, correspond to successive operating cycles of the device which is the object of the present invention.

During a cycle 1001, the following phases follow each other:
  on the channel 1, data in the DIGITAL VIDEO format, representing an event n, are transmitted,
  fixed time periods are allocated to other channels,
  on the channel 3, data in the MPEG2 format representing another event m are transmitted.

During another cycle, 1007, the following phases follow each other:
  on the channel 1, data in the DIGITAL VIDEO format, representing an event n+6, are transmitted,
  fixed time periods are allocated to other channels,
  on the channel 2, data in the MPEG2 format representing another event n are transmitted.

Subsequently, during a cycle 1009, on the channel 4, data in the DIGITAL VIDEO format represent the event m.

For each data item which it receives on a channel, the coder-decoder device 107 sends the received data, in a second format. The header is generally the same in input and output, except cases, for example, related to the isochronous or asynchronous transmission modes.

It will thus be understood that, following the operation of decoding the first format and recoding according to the second format, the same information present on the bus at a given instant, in the first format, is available on the second channel, in the second format with a time delay.

According to a variant which is not shown, more than two formats are used by each device which is the object of the present invention.

According to a variant which is not shown, more than two buses are used by each device which is the object of the present invention.

According to another variant, several data flows can be processed in parallel.

According to a last variant, not shown, there is substituted for the coder-decoder module a module adapting protocols with layers higher than the 1394 protocol layers. For example, a file transfer using the protocols known to persons skilled in the art as RBC/SBP-2 ("Reduced Block Command set/Serial Bus Protocol 2") is decoded and then coded in audio video flow using the AV/C IEC61883 protocols ("Commands set for Audio Video/transmission protocol for audio video data and control command"), and vice-versa.

The invention claimed is:

1. A communication method of communicating digital information of different data formats through a bridge unit located between at least two communication units able to communicate by at least one of the data formats, wherein the method comprises:
   a reception operation of receiving digital information having a first format, transmitted via a first communication channel from a communication unit that uses the first format;
   a determination operation of determining at least a need to reformat received digital information having the first format according to resources available on a second communication channel;
   a determination operation for determining a bandwidth allocation on the second communication channel in order to provide a minimum service of reformatting the received digital information;
   a reformat operation of reformatting the received digital information having the first format to digital information having a second format different from the first format and selected among a plurality of second formats, if a need is determined and if the allocation of the bandwidth is determined; and
   a transmission operation of transmitting the digital information having the second format via the second channel to one of the communication units,
   wherein said determination operation for determining a bandwidth allocation comprises:
   a request operation of requesting an allocation of a bandwidth that is necessary for transmitting the digital information having the second format;
   a determination operation for determining whether the requested bandwidth allocation is allocated;
   in a case in which the requested bandwidth allocation is not allocated, a renegotiation operation for requesting an allocation of a new bandwidth.

2. A communication method according to claim 1 wherein the renegotiation is withdrawn in a case of reaching a predetermined number of fruitless attempts for requesting an allocation of a new bandwidth.

3. A communication method according to claim 2, wherein, in a case in which the renegotiation is withdrawn, the reformat operation is not performed.

4. A bridge for communicating digital information of different data formats between at least two communication units able to communicate by at least one of the data formats, wherein the bridge:
   includes receiving means for receiving digital information having a first format transmitted via a first communication channel from a first communication unit that uses the first format,
   includes determination means for determining at least a need to reformat received digital information having the first format according to resources available on a second communication channel,
   includes determination means for determining a bandwidth allocation on the second communication channel in order to provide a minimum service of reformatting the received digital information,
   includes reformatting means for reformatting the received digital information having the first format to digital information having a second format different from the first format and selected among a plurality of second formats, if a need is determined and if the allocation of the bandwidth is determined, and
   is adapted to perform a transmission operation to transmit the digital information having the second format, via the second channel to one of the communication units,
   wherein said determination means for determining a bandwidth allocation comprises:
   a request unit that is adapted to request an allocation of a bandwidth that is necessary for transmitting the digital information having the second format,
   a determination unit for determining whether the requested bandwidth allocation is allocated, and
   a renegotiation unit for requesting an allocation of a new bandwidth in case the requested bandwidth allocation is not allocated.

* * * * *

UNITED STATES PATENT AND TRADEMARK OFFICE
CERTIFICATE OF CORRECTION

| | | |
|---|---|---|
| PATENT NO. | : 7,031,339 B1 | |
| APPLICATION NO. | : 09/427180 | |
| DATED | : April 18, 2006 | |
| INVENTOR(S) | : Jean-Paul Accarie | |

It is certified that error appears in the above-identified patent and that said Letters Patent is hereby corrected as shown below:

In the Drawings

SHEET 1

FIG. 1, "Periphoral" should read --Peripheral--..

COLUMN 1

Line 57, "medium." should read --medium,--.

COLUMN 4

Line 31, "and" should be deleted; and
    Line 37, "above." should read --above, and--.

COLUMN 6

Line 30, "the" (first occurrence) should be deleted.

COLUMN 7

Line 15, "etc)." should read --etc.).--; and
    Line 27, "such as" should read --such as,--.

COLUMN 8

Line 36, "Inc" should read --Inc.--; and "FIG. 2" should read --FIG. 2,--..

COLUMN 11

Line 16, "example" should read --example,--;
    Line 52, "as" should read --as,--; and "example" should read --example,--.

UNITED STATES PATENT AND TRADEMARK OFFICE
CERTIFICATE OF CORRECTION

PATENT NO. : 7,031,339 B1
APPLICATION NO. : 09/427180
DATED : April 18, 2006
INVENTOR(S) : Jean-Paul Accarie It is certified that error appears in the above-identified patent and that said Letters Patent is hereby corrected as shown below:

COLUMN 14

Line 5, "allocated;" should read --allocated; and--;
Line 9, "claim 1" should read --claim 1,--;
Line 23, "format," should read --format;--;
Line 27, "channel," should read --channel;--;
Line 31, "information," should read --information;--;
Line 37, "determined," should read --determined;--;
Line 45, "format," should read --format;--; and
Line 47, "allocated," should read --allocated;--.

Signed and Sealed this

Twenty-seventh Day of March, 2007

JON W. DUDAS
*Director of the United States Patent and Trademark Office*